April 26, 1949. P. L. SPENCER 2,468,243
ELECTRON DISCHARGE DEVICE
Filed May 7, 1945 2 Sheets-Sheet 1

INVENTOR.
PERCY L. SPENCER,
By Elmer J. Gorn
ATTY.

April 26, 1949.　　　P. L. SPENCER　　　2,468,243
ELECTRON DISCHARGE DEVICE

Filed May 7, 1945　　　　　　　　　　　　　　2 Sheets-Sheet 2

INVENTOR.
PERCY L. SPENCER,
BY
ATTY.

Patented Apr. 26, 1949

2,468,243

UNITED STATES PATENT OFFICE 2,468,243

ELECTRON DISCHARGE DEVICE

Percy L. Spencer, West Newton, Mass., assignor to Raytheon Manufacturing Company, Newton, Mass., a corporation of Delaware Application May 7, 1945, Serial No. 592,337

14 Claims. (Cl. 250—27.5)

My present invention relates to electron-discharge devices, and more particularly to tunable electron-discharge devices.

My present invention is especially suitable for tuning or frequency modulating electron-discharge devices adapted to generate electrical oscillations having a wave length of the order of a few centimeters or less, and, while not limited thereto, it is admirably adapted for use at very high frequencies, for example, video frequencies.

Some of the tuning mechanisms heretofore employed for like purposes have had the disadvantage of possessing considerable inertia, and, therefore, were limited to use at relatively low frequencies. Mechanisms which avoided this difficulty had other disadvantages, for example, the inability to modulate over a band of any appreciable width.

One of the objects, therefore, of my present invention is to eliminate the foregoing disadvantages.

Another object of my present invention is to provide simple means for electronically tuning electron-discharge devices of the general character indicated.

Still another object of my present invention is to provide electronic tuning means, especially for the so-called magnetron, which enables modulation over a considerable frequency band.

These, and other objects of my present invention, which will become more apparent as the detailed description thereof progresses, are attained, briefly, in the following manner:

I prefer to apply my present invention to an electron-discharge device of the magnetron type, consisting of a cathode, an anode structure including at least one cavity resonator, said cavity resonator having a pair of spaced conductors, presenting a capacitance therebetween, electrically connected thereto at points of opposite polarity, and means for establishing a magnetic field in a direction transversely of the electron-path between said cathode and said anode structure, a portion of said magnetic field, preferably, extending through at least one of said cavity resonators.

When a proper voltage is applied between the cathode and the anode structure of such a device, and the intensity of the magnetic field thereof is appropriately adjusted with respect to that of the electric field created by said voltage, said device generates oscillations of a wave length determined by the capacitance and inductance built into the same as a function of the geometry of the physical elements thereof, primarily, of the aforementioned cavity resonators and the capacitive conductors connected thereto.

Now, I provide, adjacent the high-capacitance regions of said cavity resonators, a source of electrons, and I establish an electric field between said source and the anode structure of the device, whereby the electrons emitted by said source are directed intermediate the above referred to conductors and into one or more of said cavity resonators.

The paths of these electrons preferably lie within and are parallel to the above-described magnetic field, said field focusing said electrons in said paths as they travel through said cavity resonators.

By these means, I am able to tune the device to a frequency other than its natural resonant frequency.

While I do not wish to be limited to any particular theory as to why this result is obtained, I believe that the introduction of the electrons into the high-capacitance regions of the cavity resonators, especially, between the capacitive conductors associated with said cavity resonators, alters the dielectric constant of the space in such regions and this, in turn, changes the resonator capacitance.

Inasmuch as the presence of the electrons alters the frequency of the device, I am able, by controlling the density of the electron-stream, to frequency modulate the device and, because, for all practical purposes, the electrons have no inertia, said modulation is not limited to any particular frequency.

Thus the disadvantages of the prior art, above set forth, are eliminated, and the highly desirable objects of my present invention, also above set forth, are attained.

In the accompanying specification I shall describe, and in the annexed drawings show, an illustrative embodiment of the electron-discharge device of my present invention. It is, however, to be clearly understood that I do not wish to be limited to the details herein shown and described for purposes of illustration only, inasmuch as changes therein may be made without the exercise of invention and within the true spirit and scope of the claims hereto appended.

Figure 1:
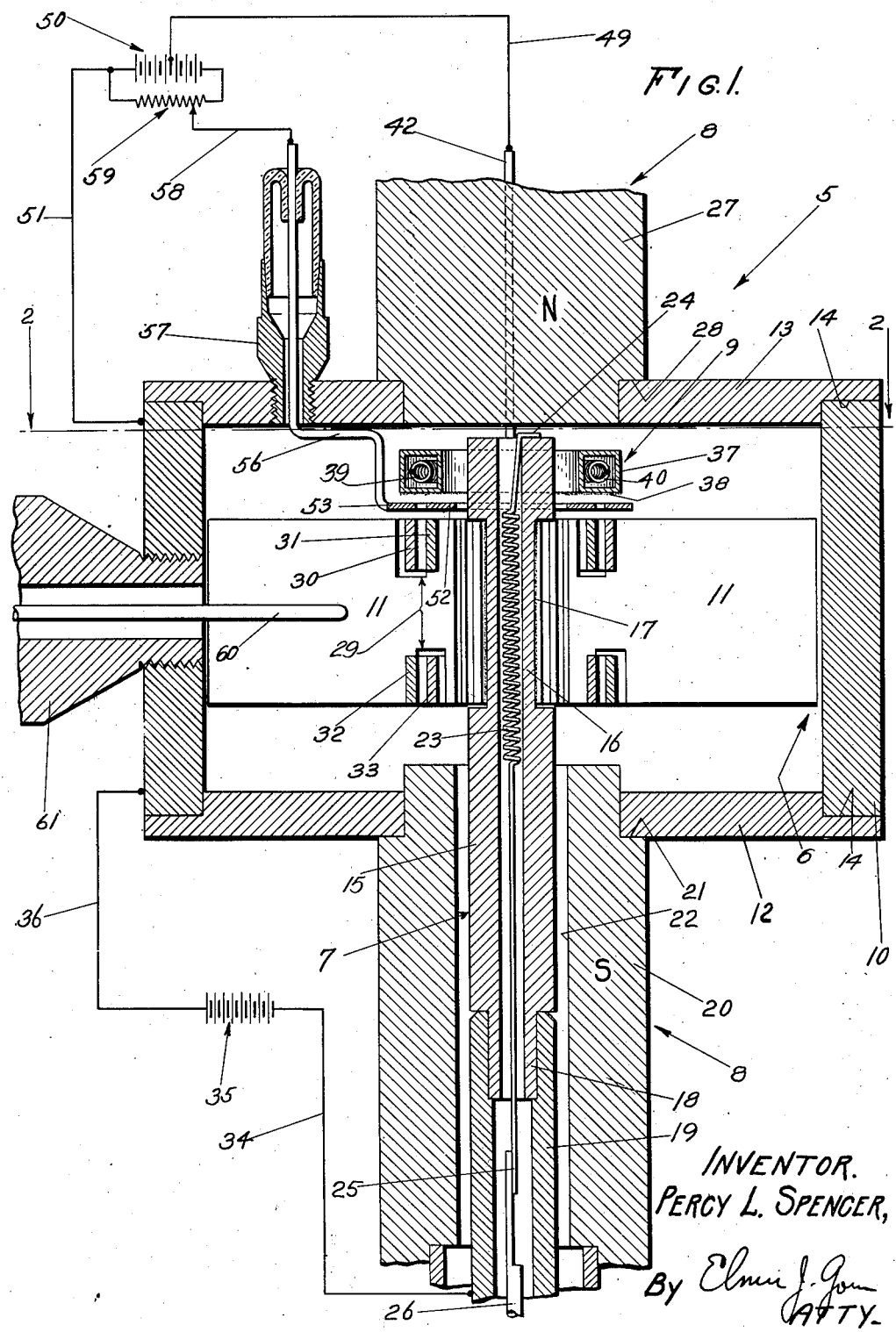
Fig. 1 is a fragmentary, longitudinal sectional view of an electron-discharge device made in accordance with the principles of my present invention.
Figure 2:
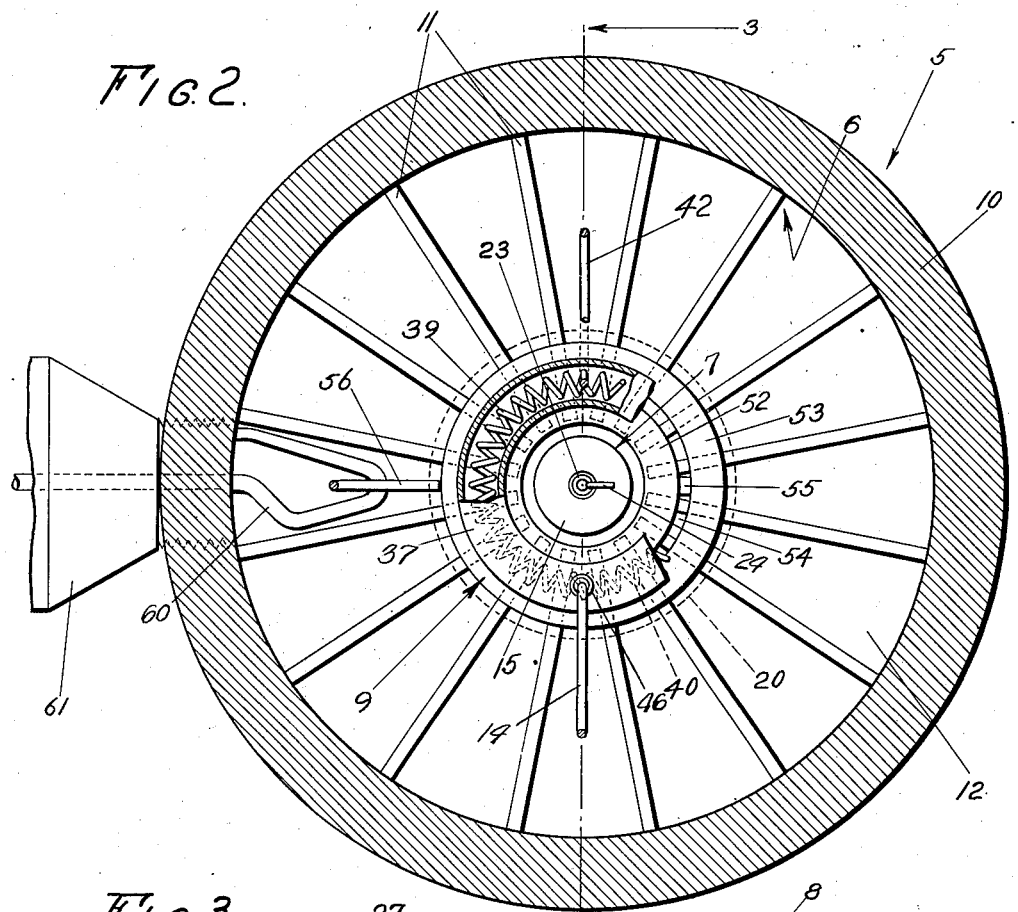
Fig. 2 is a transverse sectional view taken along line 2—2 of Fig. 1.

Referring now more in detail to the aforesaid illustrative embodiment of my present invention, and with particular reference to the drawings illustrating the same, the numeral 5 generally designates an electron-discharge device of the magnetron type.

As herein shown, said device includes an anode structure 6, a cathode structure 7, magnetic means 8 for establishing a magnetic field in a direction perpendicular to the electron-path between said cathode and anode structures, and tuning means 9.

The anode structure 6 preferably comprises a cylindrical body 10, made of highly conductive material, such as copper, and provided with a plurality, here shown as sixteen, of anode members in the form of interiorly-extending, radially-disposed vanes 11.

The cylindrical body 10 is closed at its ends by plates 12 and 13, the junctions between said body and said plates being hermetically sealed, as at 14.

The cylindrical body 10 is of such diameter, and the number, size and relative spacing of the vanes 11 are so chosen that each pair of adjacent vanes, together with that portion of said cylindrical body lying therebetween, defines a cavity resonator at the frequency desired of the output of the device.

The cathode structure 7, which is coaxial with the anode structure 6, preferably comprises an elongated sleeve 15, conventionally made of nickel, or the like, and having a reduced portion 16 which is substantially coextensive with the vertical dimension of the vanes 11, and provided with a highly electron-emissive coating 17, for example, of the well known alkaline-earth metal oxide type.

In order to support the cathode sleeve 15 with respect to the anode members 11, said sleeve may be reduced at its lower end 18 to fit into a tubular conducting member 19, the latter, in turn, being insulatedly supported in any desired manner (not shown) by a tubular pole piece 20 hermetically sealed, as at 21, into the end plate 12, said pole piece being provided with a bore 22 through which the cathode structure may enter the device.

The cathode sleeve 15 may be heated by a filament 23, connected at one end 24 to said sleeve, and at the other end 25 to a lead-in conductor 26 suitably entering the device through the tubular conducting member 19. Current may be conveyed to the filament 23 by connecting an appropriate source of voltage (not shown) between the member 19 and the lead-in conductor 26.

Another pole piece 27 is hermetically sealed, as at 28, into the end plate 13, said pole piece, and the pole piece 20, being fixed, for example, at the opposite ends of a horseshoe magnet (not shown), the two pole pieces and the horseshoe magnet constituting the above referred to magnetic means 8 for establishing a magnetic field transversely of the electron-path between the cathode and anode structures of the device.

In order to increase the capacitance of the cavity resonators defined by the anode structure 6, I provide the vanes 11, preferably, in both the upper and lower edges thereof, adjacent their inner ends, with slots 29 receptive of two pairs of concentric conductors or straps 30 and 31, and 32 and 33, the straps of each pair thereof alternately contacting successive vanes 11, in other words, alternately contacting each cavity resonator at points of opposite polarity.

The cathode and anode structures of the device may be maintained at a proper potential difference, for example, by connecting the tubular conducting member 19, through a conductor 34, to the negative terminal of a source 35 of direct current, and by connecting the anode structure 6, through a conductor 36, to the positive terminal of said direct-current source.

Figure 3:
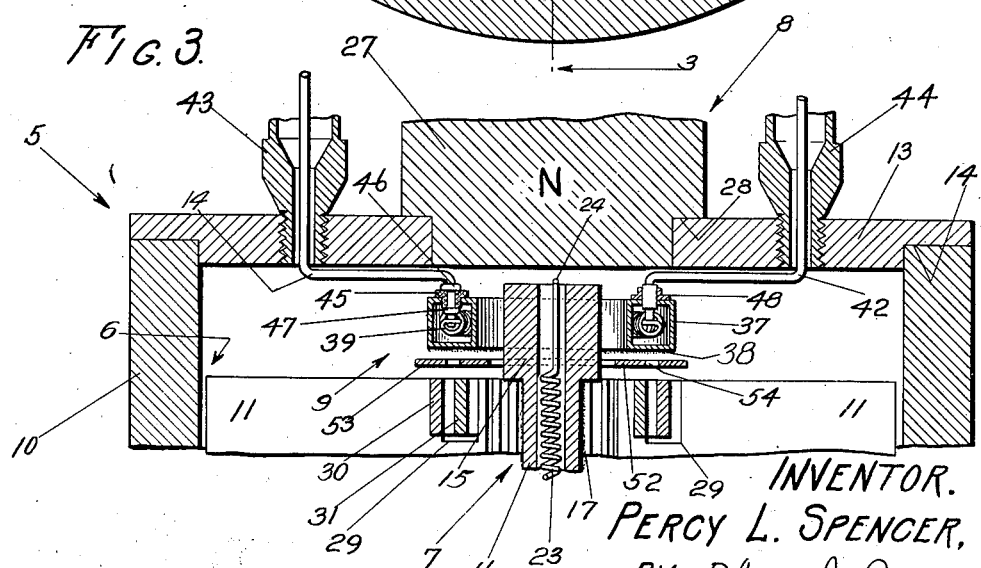
Fig. 3 is a fragmentary, longitudinal sectional view taken along line 3—3 of Fig. 2.

Now, in the device as thus far described, there is no means for controlling the frequency thereof, and in order to provide such means, I proceed as follows:

An annular, hollow cathode member 37 is disposed within the device, above the vanes 11, adjacent the high-capacitance regions of the cavity resonators defined by the anode structure, said cathode member being provided, on its surface facing the concentric conductors 30 and 31, with a highly electron-emissive coating 38, for example, of the alkaline-earth metal oxide type. Said cathode member is also provided, in the interior thereof, with a pair of heating filaments 39 and 40 connected in parallel between lead-in conductors 41 and 42 (best seen in Fig. 3), which enter the device through pipes 43 and 44 threaded and hermetically sealed into the end plate 13.

The lead-in conductors 41 and 42 may be connected to a suitable source of voltage (not shown), whereby current may be conveyed to the filaments 39 and 40.

The conductor 41 may enter the cathode member 37 through an insulating bushing 45 suitably secured to said cathode member, and may provide partial support for said cathode member by being upset, as at 46 and 47. The conductor 42 may enter the cathode member 37 through a conducting bushing 48 secured to said cathode member, said conductor, like the conductor 41, providing partial support for the cathode member.

The conductor 42 may be connected, through a conductor 49, to a negative tap on a suitable source 50 of direct-current voltage, and the anode structure 6 may be connected, through a conductor 51, to the positive terminal of said source of voltage, thus establishing a potential difference between the cathode member 37 and said anode structure.

As a result, the electrons emitted by the cathode member 37 are drawn downwardly between the spaced conductors 30 and 31 and into the cavity resonators defined by the vanes 11 in cooperation with the cylindrical body 10 of the anode structure. It will be noted that the paths along which the electrons are directed lie within and are parallel to the magnetic field established between the pole pieces 27 and 20 or, at least, within the leakage portions of said magnetic field. Therefore, they are focused and maintained in such paths substantially throughout their travel through the cavity resonators.

As indicated in earlier portions of this specification, I believe that the effect of these electrons is to alter the dielectric constant of the space in the cavity resonators, especially in the high-capacitance regions thereof, and this, in turn, alters the over-all capacitance of the device.

In order to utilize this effect to frequency modulate the device, I provide, intermediate the cathode member 37 and the vanes 11, means for controlling the density of the electron-stream entering the cavity resonators. Such means may take the form, for example, of a pair of concentric, conducting annuli 52 and 53 having therebetween a space 54 aligned with the space between the conductors 30 and 31, and being connected to each other at intervals, by ribs 55.

As shown, the annuli 52 and 53 are connected to and supported by a lead-in conductor 56 which enters the device through a pipe 57 threaded and hermetically sealed into the end plate 13, said lead-in conductor, in turn, being connected, through a conductor 58, to the variable arm of a potentiometer 59 connected across the direct-current source 50.

By varying the potential applied between the cathode member 37 and the annuli 52 and 53, for example, at a video-frequency rate, the density of the electron-stream entering the cavity resonators is correspondingly varied, and the device is accordingly frequency modulated.

In order to extract power from the device, I may, for example, introduce a loop 60 into any one of the cavity resonators defined by the anode structure, said loop passing out of the device through a pipe 61 threaded and hermetically sealed in the cylindrical body 10.

This completes the description of the aforesaid illustrative embodiment of my present invention. It will be noted from all of the foregoing that the disadvantages, associated with prior mechanisms for tuning or frequency modulating the electron-discharge devices of the general character herein referred to, have been eliminated. Inasmuch as the tunning or modulating, as taught by my present invention, is accomplished electronically, and, for all practical purposes, electrons have no inertia, there is no limitation on the frequencies at which the device may be used. It will further be noted that inasmuch as the electrons can be introduced into any number of the cavity resonators incorporated in the device, increased control over the frequency of the device can be obtained, and the deviation from the natural resonant frequency of the device can be made appreciable.

Other advantages of the device of my present invention will readily occur to those skilled in the art to which the same relates.

What is claimed is:

1. An electron-discharge device comprising: a cathode; an anode structure, spaced from said cathode, and including a cavity resonator; means, supported adjacent said cathode and said anode structure, for establishing a magnetic field in a direction transversely of the electron path between said cathode and said anode structure; a pair of conductors alternately connected to points of opposite polarity on said cavity resonator; said conductors presenting an interconductor capacitance therebetween; a source of electrons supported adjacent said conductors; and means, intermediate said source of electrons and said conductors, for directing the electrons emitted by said source intermediate said conductors, whereby said interconductor capacitance may be altered and said device tuned to a frequency other than its natural resonant frequency.

2. An electron-discharge device comprising: a cathode; an anode structure, spaced from said cathode, and including a plurality of anode members; each pair of adjacent anode members, together with that portion of said anode structure lying therebetween, defining a cavity resonator; means, supported adjacent said cathode and said anode structure, for establishing a magnetic field in a direction transversely of the electron path between said cathode and said anode structure; a pair of conductors alternately connected to the anode members of each adjacent pair thereof; said conductors presenting an interconductor capacitance therebetween; a source of electrons supported adjacent said conductors; and means, intermediate said source of electrons and said conductors, for directing the electrons emitted by said source intermediate said conductors, whereby said interconductor capacitance may be altered and said device tuned to a frequency other than its natural resonant frequency.

3. An electron-discharge device comprising: a cathode; an anode structure, spaced from said cathode, and including a plurality of radially-disposed anode members; each pair of adjacent anode members, together with that portion of said anode structure lying therebetween, defining a cavity resonator; means supported adjacent said cathode and said anode structure, for establishing a magnetic field in a direction transversely of the electron path between said cathode and said anode structure; a pair of annular conductors alternately connected successively to said anode members; said conductors being concentric with respect to each other and presenting an interconductor capacitance therebetween; a source of electrons supported adjacent said conductors; and means intermediate said source of electrons and said conductors, for directing the electrons emitted by said source intermediate said conductors, whereby said interconductor capacitance may be altered and said device tuned to a frequency other than its natural resonant frequency.

4. An electron-discharge device comprising: a cathode; an anode structure, spaced from said cathode, and including a cavity resonator; means, supported adjacent said cathode and said anode structure, for establishing a magnetic field in a direction transversely of the electron path between said cathode and said anode structure; a pair of conductors alternately connected to points of opposite polarity on said cavity resonator; said conductors presenting an interconductor capacitance therebetween; a source of electrons, supported adjacent said conductors, and adapted to have a voltage established between itself and said anode structure for directing the electrons emitted thereby intermediate said conductors, whereby said interconductor capacitance may be altered and said device tuned to a frequency other than its natural resonant frequency; and means, supported intermediate said source of electrons and said anode structure, for controlling the density of the electron-flow between said source and said anode structure.

5. An electron-discharge device comprising: a cathode; an anode structure, spaced from said cathode, and including a plurality of anode members; each pair of adjacent anode members, together with that portion of said anode structure lying therebetween, defining a cavity resonator; means, supported adjacent said cathode and said anode structure, for establishing a magnetic field in a direction transversely of the electron path between said cathode and said anode structure; a pair of conductors alternately connected to the anode members of each adjacent pair thereof; said conductors presenting an interconductor capacitance therebetween; a source of electrons, supported adjacent said conductors, and adapted to have a voltage established between itself and said anode structure for directing the electrons emitted thereby intermediate said conductors, whereby said interconductor capacitance may be altered and said device tuned to a frequency other than its natural resonant frequency; and means, supported intermediate said source of electrons and said anode structure, for controlling the density of the electron-flow between said source and said anode structure.

6. An electron-discharge device comprising: a cathode; an anode structure, spaced from said cathode, and including a plurality of radially-disposed anode members, each pair of adjacent anode members, together with that portion of said anode structure lying therebetween, defining a cavity resonator; means, supported adjacent said cathode and said anode structure, for establishing a magnetic field in a direction transversely of the electron path between said cathode and said anode structure; a pair of annular conductors alternately connected successively to said anode members; said conductors being concentric with respect to each other and presenting an interconductor capacitance therebetween; a source of electrons, supported adjacent said conductors, and adapted to have a voltage established between itself and said anode structure for directing the electrons emitted thereby intermediate said conductors, whereby said interconductor capacitance may be altered and said device tuned to a frequency other than its natural resonant frequency; and means, supported intermediate said source of electrons and said anode structure, for controlling the density of the electron-flow between said source and said anode structure.

7. An electron-discharge device comprising: a cathode; an anode structure, spaced from said cathode, and including a cavity resonator; means, supported adjacent said cathode and said anode structure, for establishing a magnetic field through said cavity resonator in a direction transverse to the electron-path between said cathode and said anode structure; a source of electrons supported adjacent said cavity resonator; and means, intermediate said source of electrons and said cavity resonator, for directing the electrons emitted by said source into said cavity resonator along a path within and substantially parallel to said magnetic field, whereby said device may be tuned to a frequency other than its natural resonant frequeny.

8. An electrode-discharge device comprising: a cathode; an anode structure, spaced from said cathode, and including a plurality of anode members; each pair of adjacent anode members, together with that portion of said anode structure lying therebetween, defining a cavity resonator; means, supported adjacent said cathode and said anode structure, for establishing a magnetic field through said cavity resonators; a source of electrons supported adjacent said cavity resonators, and means, intermediate said source of electrons and said cavity resonators for directing the electrons emitted by said source into said cavity resonators along a path within and substantially parallel to said magnetic field, whereby said device may be tuned to a frequency other than its natural resonant frequency.

9. An electron-discharge device comprising: a cathode; an anode structure, spaced from said cathode, and including a cavity resonator; means, supported adjacent said cathode and said anode structure, for establishing a magnetic field through said cavity resonator; a pair of conductors alternately connected to points of opposite polarity on said cavity resonator; said conductors presenting a capacitance therebetween; a source of electrons supported adjacent said cavity resonator; and means, intermediate said source of electrons and said cavity resonator, for directing the electrons emitted by said source into said cavity resonator along a path between said conductors and within and substantially parallel to said magnetic field, whereby said device may be tuned to a frequency other than its natural resonant frequency.

10. An electron-discharge device comprising: a cathode; an anode structure, spaced from said cathode, and including a plurality of anode members; each pair of adjacent anode members, together with that portion of said anode structure lying therebetween, defining a cavity resonator; means, supported adjacent said cathode and said anode structure, for establishing a magnetic field through said cavity resonators; a pair of concentric conductors alternately connected successively to said anode members; said conductors presenting a capacitance therebetween; a source of electrons supported adjacent said cavity resonators; and means, intermediate said source of electrons and said cavity resonators, for directing the electrons emitted by said source into said cavity resonators along a path between said conductors and within and substantially parallel to said magnetic field, whereby said device may be tuned to a frequency other than its natural resonant frequency.

11. An electron-discharge device comprising: a cathode; an anode structure, spaced from said cathode, and including a cavity resonator; means, supported adjacent said cathode and said anode structure, for establishing a magnetic field in a direction transversely of the electron-path between said cathode and said anode structure; said magnetic field having a portion thereof extending through said cavity resonator; a source of electrons, supported adjacent said cavity resonator, and adapted to have a voltage established between itself and said anode structure for directing the electrons emitted thereby into said cavity resonator along a path within and substantially parallel to said magnetic field, whereby said device may be tuned to a frequency other than its natural resonant frequency; and means, supported intermediate said source of electrons and said anode structure, for controlling the density of the electron-flow between said source and said anode structure.

12. An electron-discharge device comprising: a cathode; an anode structure, spaced from said cathode, and including a plurality of anode members; each pair of adjacent anode members, together with that portion of said anode structure lying therebetween, defining a cavity resonator; means, supported adjacent said cathode and said anode structure, for establishing a magnetic field in a direction transversely of the electron-path between said cathode and said anode structure; said magnetic field having a portion thereof extending through said cavity resonators; a source of electrons, supported adjacent said cavity resonators, and adapted to have a voltage established between itself and said anode structure for directing the electrons emitted thereby into said cavity resonators along a path within and substantially parallel to said magnetic field, whereby said device may be tuned to a frequency other than its natural resonant frequency; and means, supported intermediate said source of electrons and said anode structure, for controlling the density of the electron-flow between said source and said anode structure.

13. An electron-discharge device comprising: a cathode; an anode structure, spaced from said cathode, and including a cavity resonator; means, supported adjacent said cathode and said anode structure, for establishing a magnetic field in a direction transversely of the electron-path between said cathode and said anode structure; said magnetic field having a portion thereof extending through said cavity resonator; a pair of conductors alternately connected to points of opposite polarity on said cavity resonator; said conductors presenting a capacitance therebetween; a source of electrons, supported adjacent said cavity resonator, and adapted to have a voltage established between itself and said anode structure for directing the electrons emitted thereby intermediate said conductors and into said cavity resonator along a path within and substantially parallel to said magnetic field, whereby said device may be tuned to a frequency other than its natural resonant frequency; and means, supported intermediate said source of electrons and said anode structure, for controlling the density of the electron-flow between said source and said anode structure.

14. An electron-discharge device comprising: a cathode; an anode structure, spaced from said cathode, and including a plurality of anode members; each pair of adjacent anode members, together with that portion of said anode structure lying therebetween, defining a cavity resonator; means, supported adjacent said cathode and said anode structure, for establishing a magnetic field in a direction transversely of the electron-path between said cathode and said anode structure; said magnetic field having a portion thereof extending through said cavity resonator; a pair of concentric conductors alternately connected successively to said anode members; said conductors presenting a capacitance therebetween; a source of electrons, supported adjacent said cavity resonator, and adapted to have a voltage established between itself and said anode structure for directing the electrons emitted thereby intermediate said conductors and into said cavity resonator along a path within and substantially parallel to said magnetic field, whereby said device may be tuned to a frequency other than its natural resonant frequency; and means, supported intermediate said source of electrons and said anode structure, for controlling the density of the electron-flow between said source and said anode structure.

PERCY L. SPENCER.

REFERENCES CITED

The following references are of record in the file of this patent:

UNITED STATES PATENTS

| Number | Name | Date |
|---|---|---|
| 2,167,201 | Dallenbach | July 25, 1939 |
| 2,241,976 | Blewett et al. | May 13, 1941 |
| 2,247,077 | Blewett et al. | June 24, 1941 |
| 2,413,385 | Schmidt | Dec. 31, 1946 |

Disclaimer 2,468,243.—*Percy L. Spencer*, West Newton, Mass. ELECTRON DISCHARGE DEVICE.
Patent dated Apr. 26, 1949. Disclaimer filed Oct. 20, 1950, by the inventor; the assignee, *Raytheon Manufacturing Company*, assenting.

Hereby enters this disclaimer to claims 7, 8, 11, and 12 of said patent.

[*Official Gazette November 21, 1950.*]